United States Patent [19]

Cosgrove

[11] 3,886,258

[45] May 27, 1975

[54] PROCESS OF OBTAINING ZINC OXIDE HAVING IMPROVED FILTERING CHARACTERISTICS AND PRODUCTION OF ZINC SULFATE FROM SAID ZINC OXIDE

[75] Inventor: John H. Cosgrove, Media, Pa.

[73] Assignee: FMC Corporation, Philadelphia, Pa.

[22] Filed: July 2, 1971

[21] Appl. No.: 159,441

[52] U.S. Cl. ............... 423/106; 423/101; 423/544; 423/622; 423/632; 264/38
[51] Int. Cl. ......................... C01g 9/02; C01g 9/06
[58] Field of Search....... 23/147, 1 R, 1 B; 423/622, 423/101, 102, 106, 544, 632

[56] References Cited
UNITED STATES PATENTS

| | | | |
|---|---|---|---|
| 2,991,884 | 7/1961 | Shackmann et al. | 23/147 X |
| 3,674,476 | 7/1972 | Tamai et al. | 423/622 X |

FOREIGN PATENTS OR APPLICATIONS

| | | | |
|---|---|---|---|
| 678,462 | 9/1952 | United Kingdom | 423/622 |
| 204,322 | 10/1924 | United Kingdom | 23/147 |
| 838,851 | 6/1960 | United Kingdom | 23/147 |
| 1,086,856 | 8/1960 | Germany | 23/147 |

Primary Examiner—Edward Stern

[57] ABSTRACT

A dilute aqueous slurry of hydrated zinc oxide is subjected to heat and pressure to obtain solids having improved filtering characteristics. The process is especially useful in the treatment of neutralized waste liquor from the viscose rayon system to provide a more economical method for the recovery of zinc sulfate.

9 Claims, 1 Drawing Figure

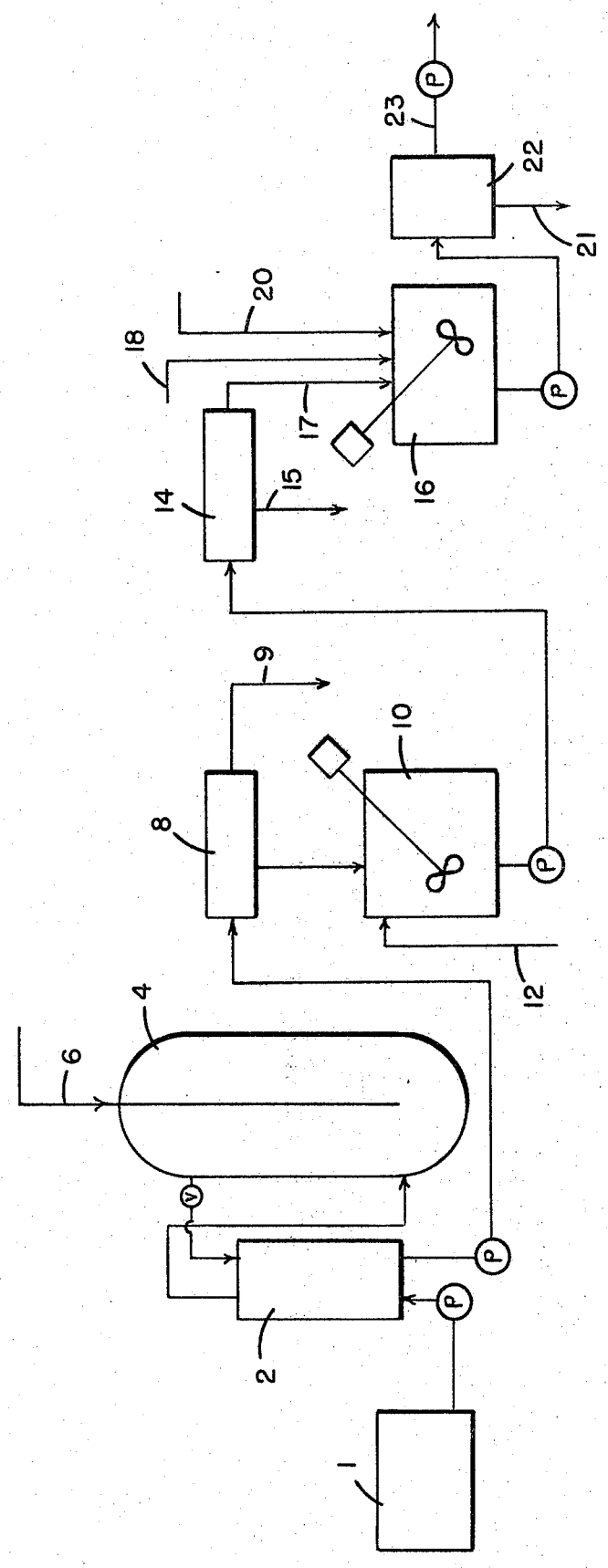

3,886,258

PROCESS OF OBTAINING ZINC OXIDE HAVING IMPROVED FILTERING CHARACTERISTICS AND PRODUCTION OF ZINC SULFATE FROM SAID ZINC OXIDE

It is known to recover zinc hydroxide or hydrated zinc oxide by filtration of a dilute slurry thereof. The recovery of zinc from viscose spinning baths and processing liquors is taught, for example, in British Pat. No. 678,462 and U.S. Pat. No. 3,380,804. The former patent discloses the addition of either a combination of lime and caustic soda to waste viscose processing liquor to first neutralize the acid and then precipitate the zinc as zinc hydroxide or the use of caustic soda alone for this purpose. The temperature employed is above 60°C. although 90°C. is the highest temperature mentioned in the specification. The latter patent discloses a process of cation exchange to recover zinc from the viscose process liquor.

Other methods for recovering zinc from waste slurries include drying with calcining, chemical extraction, pressing and electrolytic separation.

The above methods are presently considered to be too expensive for use in the competitive rayon industry, however, it has become imperative that such waste material be reprocessed to prevent overflow of neutralized waste stored in field basins into rivers, streams and underground water.

It is a primary object of this invention to provide an economically feasible system for recovery of a more useful zinc product from a dilute aqueous slurry of hydrated zinc oxide.

It is another object of this invention to provide a method wherein a slurry containing flocculant hydrated zinc oxide is treated to produce a change in filtration characteristics of the zinc oxide whereby the solids retain less water on recovery.

These and other objects are accomplished in accordance with this invention by elevating the temperature of a dilute aqueous slurry of hydrated zinc oxide to at least about 257°F. under an elevated pressure sufficient to prevent loss of water from the slurry for a time sufficient to decrease the water of hydration content of the hydrated zinc oxide in the slurry but no less than about 5 minutes, and then recovering the filterable solids.

The minimum temperature of about 257°F. is required in order to obtain a decrease in water of hydration content of the hydrated zinc oxide in the slurry. It is preferred from the standpoint of optimum results in the plant, that the slurry temperature be maintained from about 325° to 350°F. for a time period of about 10 minutes. This is most practically accomplished by injecting steam into the slurry contained in a pressure vessel. However, other means of heating the slurry in a pressure vessel can be employed.

The minimum time of treatment of at least 5 minutes is dictated by the limitations of conventional pressure systems which require time for injecting heat or steam, treatment time and time for relieving pressure on the system. In general, optimum treatment time of the slurry, as stated above, is about 10 minutes when the temperature range is at its optimum.

The term — "elevated pressure sufficient to prevent loss of water from the slurry" — is meant to include processes wherein some water is allowed to escape the pressurized system which is maintained at least at the minimum prescribed temperature. However, sufficient water must remain to act as a solvent for water-soluble impurities in the system above that held by the zinc oxide during filtration.

The process of this invention is advantageously employed in the recovery of useful zinc sulfate solution from waste treatment liquor from the viscose rayon process. Waste liquor from the viscose rayon process usually contains sulfuric acid, sodium sulfate, small amounts of zinc sulfate and impurities which are picked up from contact with processing machinery. The collected waste liquor is treated with sufficient lime [Ca(OH)$_2$] to neutralize the acid and convert the zinc sulfate to zinc hydroxide. Alternatively, lime and caustic soda can be used as taught in British Pat. No. 678,462 to neutralize and raise the pH of the slurry. The zinc hydrate slurry is passed through a clarifier where the sludge settles out and the substantially clear effluent is passed to waste.

As shown in the drawing, the sludge from the clarifier 1 can be passed directly to the treatment apparatus in accordance with the process of this invention or passed to fluid basins for later processing.

In any event, the slurry containing from about 1 to about 10 percent, preferably 1 to 4 percent, solids of which a predominant amount is zinc hydroxide, usually about 40–60 wt.%, is first preferably preheated by passing it through a heat exchanger 2 and then to the heated pressure vessel 4 into which superheated steam is injected at 6. After the required residence time in vessel 4, the sludge is passed back through heat exchanger 2 and then through a pressure filter 8. The filter cake from filter 8 is transferred to an acid mixing tank 10 into which sulfuric acid flows through conduit 12. The filtrate from filter 8 is removed through line 9. A solution of zinc sulfate containing calcium sulfate, organics (from cellulose) and ferrous sulfate is formed and pumped to pressure filter 14 wherein the filter cake is dumped as waste through 15 and the filtrate passed to mixing vessel 16 through line 17. An oxidizing agent, for example, hydrogen peroxide and a pH adjuster, for example, sodium hydroxide enter the mixing vessel through lines 18 and 20, respectively. After mixing, the sulfate solution containing filterable ferric hydroxide is pumped to vacuum filter 22 and the iron precipitate removed through 21. The recovered zinc sulfate solution may now be pumped through line 23 to a holding tank or directly to viscose processing baths. The above process has been described with a minimum of steps and it will be realized that the process can be carried out using additional apparatus and steps. For example, holding or surge tanks can be interposed between each processing unit and slurries and solutions can be recycled to obtain higher yields and greater product purity.

Advantageously, the inclusion of the step of heating the hydrate slurry under pressure provides a zinc oxide of changed filtration characteristics whereby the filtered solids contain much less water. This permits the removal of much more of the water-soluble impurities during filtration. Furthermore, in order to obtain a zinc sulfate solution of the desired concentration by the addition of sulfuric acid to the filter cake, little or no heat energy is needed to boil off excess water. Thus, this step is required to provide an economical process.

The following examples will demonstrate the method of this invention.

EXAMPLE I

Lime neutralized viscose rayon process liquor in the form of a sludge containing about 4 percent flocculant solids of which about 50 percent is zinc hydroxide is heated in a 2 gallon pressure reactor by direct injection of steam at various temperatures and time without loss of sludge liquid. At the end of each treatment, the pressure is released to atmospheric over a time period of approximately ten minutes. The treated sludge is cooled and then vacuum filtered in the laboratory. Filtration is continued past the point at which the cake cracked and stopped when no additional cracking is apparent.

The effect of temperature and residence time on the filtration characteristics of the treated sludge is shown in the following table:

TABLE

| Steam Temp. °F. | Time, min. | % Solids* |
|---|---|---|
| Ambient (No steam treatment) | — | 7.7 |
| 280 (35 p.s.i.g.) | 240 | 28.0 |
| 298 (50 p.s.i.g.) | 45 | 10.6 |
| 320 (75 p.s.i.g.) | 10 | 14 – 14.5 |
| '' | 20 | 14.5 – 16 |
| '' | 30 | 21 – 26 |
| '' | 45 | 31.5 – 32.5 |
| 338 (100 p.s.i.g.) | 10 | 21 – 21.5 |
| '' | 20 | 26.5 – 27.5 |
| '' | 30 | 37.5 |
| '' | 40 | 35 |
| 353 (125 p.s.i.g.) | 10 | 35.5 |
| '' | 20 | 34.5 |
| '' | 30 | 33.5 – 36.5 |
| '' | 45 | 34 – 34.5 |

*Based on weight of filter cake

EXAMPLE II

Waste viscose rayon processing liquor is neutralized with sufficient lime [Ca(OH)$_2$] to convert the zinc sulfate to zinc hydroxide. The resulting slurry is passed to a clarifier unit and the sludge from this unit contains 1–2 percent flocculant solids of which about 50 percent by weight is zinc hydroxide. This is continuously pumped to a surge tank and then through a heat exchanger to preheat it. The sludge is then pumped into a pressure treatment vessel wherein it is subject to steam at 150 p.s.i.g. (366°F.) for a residence time of 10 minutes. The sludge temperature reaches about 340°F. The sludge is pumped through the heat exchanger to transfer heat to incoming sludge and then to a surge tank from which it is pumped to a pressure filter wherein most of the filterable solids are removed. The effluent from the pressure filter may be recycled or run out as waste while the filtered solids are deposited in an acid reactor having mechanical agitating means. Sufficient sulfuric acid at the required concentration is piped into the acid reactor to provide a zinc sulfate solution at a concentration of 30 percent. The solution is then pumped to a surge tank and from there to a pressure filter. The filtered solids from the filter containing some residual zinc sulfate may be periodically repulped by passing it back to another mixing tank which provides a solution slurry which is returned to the pressure filter. Eventually, the solids such as calcium sulfate and organics are dumped as waste.

To remove iron which is detrimental to the viscose process, the filtrate from the pressure filter is passed to a solution mixing tank and sufficient sodium hydroxide and hydrogen peroxide are added to convert the ferrous salt to ferric hydroxide. The pH of the solution is raised to 5 by the addition of the sodium hydroxide. The residence time in the solution mixing tank is sufficient to permit substantially all of the iron oxide to coagulate into filterable particles. This solution is then passed to a rotary vacuum filter wherein the iron content of the solution is brought down to the desired amount, e.g., about 100 p.p.m. The zinc sulfate solution is now ready for reuse in a viscose rayon process.

A steam temperature of between about 350° and about 370°F. or steam under pressure of about 125 p.s.i.g. to about 150 p.s.i.g. is advantageously employed for the preferred time period to heat the slurry between 325° and 350°F.

Various changes and modifications may be made in practicing the invention without departing from the spirit and scope thereof and, therefore, the invention is not to be limited except as defined in the appended claims.

I claim:

1. A process for improving the filtration characteristics of solids in a dilute aqueous slurry of hydrated zinc oxide which comprises elevating the temperature of said slurry to at least 257°F. under an elevated pressure sufficient to prevent essentially any loss of the water in the slurry and for a time sufficient to decrease the water of hydration content of the hydrated zinc oxide, said time period being at least 5 minutes, and then treating the slurry to recover filterable solids including zinc oxide therefrom.

2. The process of claim 1 wherein the dilute aqueous slurry of hydrated zinc oxide is neutralized waste liquor from a viscose process for manufacturing cellulose rayon filaments said waste liquor containing zinc sulfate prior to neutralization.

3. The process of claim 1 wherein the elevated temperature of the slurry is provided by steam under pressure.

4. The process of claim 3 wherein the steam is supplied at a pressure of at least 125 p.s.i.g. for at least 10 minutes.

5. The process of claim 2 wherein waste liquor has been neutralized with lime [Ca(OH)$_2$].

6. The process of claim 2 wherein the filtered solids are treated with aqueous sulfuric acid in an amount sufficient to convert substantially all of the zinc oxide to zinc sulfate.

7. The process of claim 6 wherein the zinc sulfate solution is filtered and the filtrate recovered.

8. The process of claim 7 wherein ferrous ions in said solution are oxidized to ferric ions, the pH of the solution ajusted to precipitate ferric hydroxide and the ferric hydroxide is removed from the solution.

9. The process of claim 8 wherein the substantially iron-free filtrate is returned to the viscose process.

* * * * *